United States Patent [19]
Ozawa

[11] Patent Number: 5,174,257
[45] Date of Patent: Dec. 29, 1992

[54] BALANCER SHAFT FOR TWO CYCLE ENGINE

[75] Inventor: Toshikazu Ozawa, Iwata, Japan

[73] Assignee: Yamaha Hatsudoki Kabushiki Kaisha, Iwata, Japan

[21] Appl. No.: 814,803

[22] Filed: Dec. 30, 1991

[30] Foreign Application Priority Data
Jan. 10, 1990 [JP] Japan ................... 3-001577

[51] Int. Cl.⁵ ............................................. F02B 75/00
[52] U.S. Cl. .................................... 123/192.2; 74/603
[58] Field of Search ................ 123/192.2; 74/603, 604

[56] References Cited
U.S. PATENT DOCUMENTS

| | | | |
|---|---|---|---|
| 1,163,832 | 12/1915 | Lanchester | 123/192.2 |
| 4,509,378 | 4/1985 | Brown | 123/192.2 |
| 4,574,749 | 3/1986 | Negre | 123/192.2 |
| 4,741,303 | 5/1988 | Kronich | 123/192.2 |
| 4,800,852 | 1/1989 | Kandler | 123/192.2 |
| 5,012,775 | 5/1991 | Oike | 123/192.2 |

Primary Examiner—Noah P. Kamen
Attorney, Agent, or Firm—Ernest A. Beutler

[57] ABSTRACT

A balancer shaft arrangement for a two cycle, crankcase compression, internal combustion engine wherein the balancer shaft is driven from the crankshaft and is disposed below the crankcase and externally of it. The balancer shaft is driven from end of the crankshft and a flywheel is driven at the other end of the crankshaft. The balancer shaft axis is disposed at a lesser distance from the crankshaft axis than the radius of the flywheel so as to provide a compact assembly.

18 Claims, 3 Drawing Sheets

BALANCER SHAFT FOR TWO CYCLE ENGINE

BACKGROUND OF THE INVENTION

This invention relates to a balancer shaft for a two cycle engine and more particularly to an improved and compact balancing arrangement for an internal combustion engine.

It is well known that reciprocating engines generate certain forces which should be balanced to provide smooth running. One way in which certain of these forces is balanced, is by providing a balancing shaft having eccentric masses which is driven from the engine crankshaft and which rotates at the same speed as the crankshaft but in an opposite direction. Although such balancing shafts have high utility and provide smooth running engines, the addition of a further shaft to the engine crankshaft complicates and enlarges the overall construction of the engine.

Conventionally it has been the practice to provide these balance shafts on the side of the engine crankshaft so as to avoid any increase in height of the overall engine. It is undesirable for a number of reasons to increase the height of the engine. Increasing the height of the engine not only raises the center of gravity of the engine in the overall vehicle but precludes the use of low hood lines which are important for aerodynamic reasons.

When a balancer shaft is employed with a two cycle, crankcase compression engine, additional problems arise. Normally it is the practice to induct air into the engine crankcase and if the balancer shaft also rotates in the crankcase, as is common practice, then the volume of the crankcase chamber becomes too large to permit effective compression. In addition, the added rotating operation of the balancer shaft in the crankcase can give rise to flows in the crankcase chamber that can adversely effect the induction system.

It is, therefore, a principal object to this invention to provide an improved balancer shaft arrangement for an internal combustion engine.

It is a further object to this invention to provide a balancer shaft arrangement for an engine that will not increase the overall height of the engine.

It is yet a further object to this invention to provide an improved balancer shaft arrangement for a two cycle, crankcase compression engine wherein the balancer shaft does not rotate within the crankcase chamber but is positioned closely adjacent the crankshaft.

SUMMARY OF THE INVENTION

This invention is adapted to be embodied in a balancer shaft arrangement for an internal combustion engine comprises a crankcase defining at least one crankcase chamber in which a crankshaft rotates. A cylinder block extends from one side of the crankcase and defines at least one cylinder receiving a piston that drives the crankshaft. A balancer shaft is driven by the crankshaft and has its access positioned substantially diametrically opposite of the cylinder block.

DETAILED DESCRIPTION OF THE PREFERRED EMBODIMENT OF THE INVENTION

Figure 1:
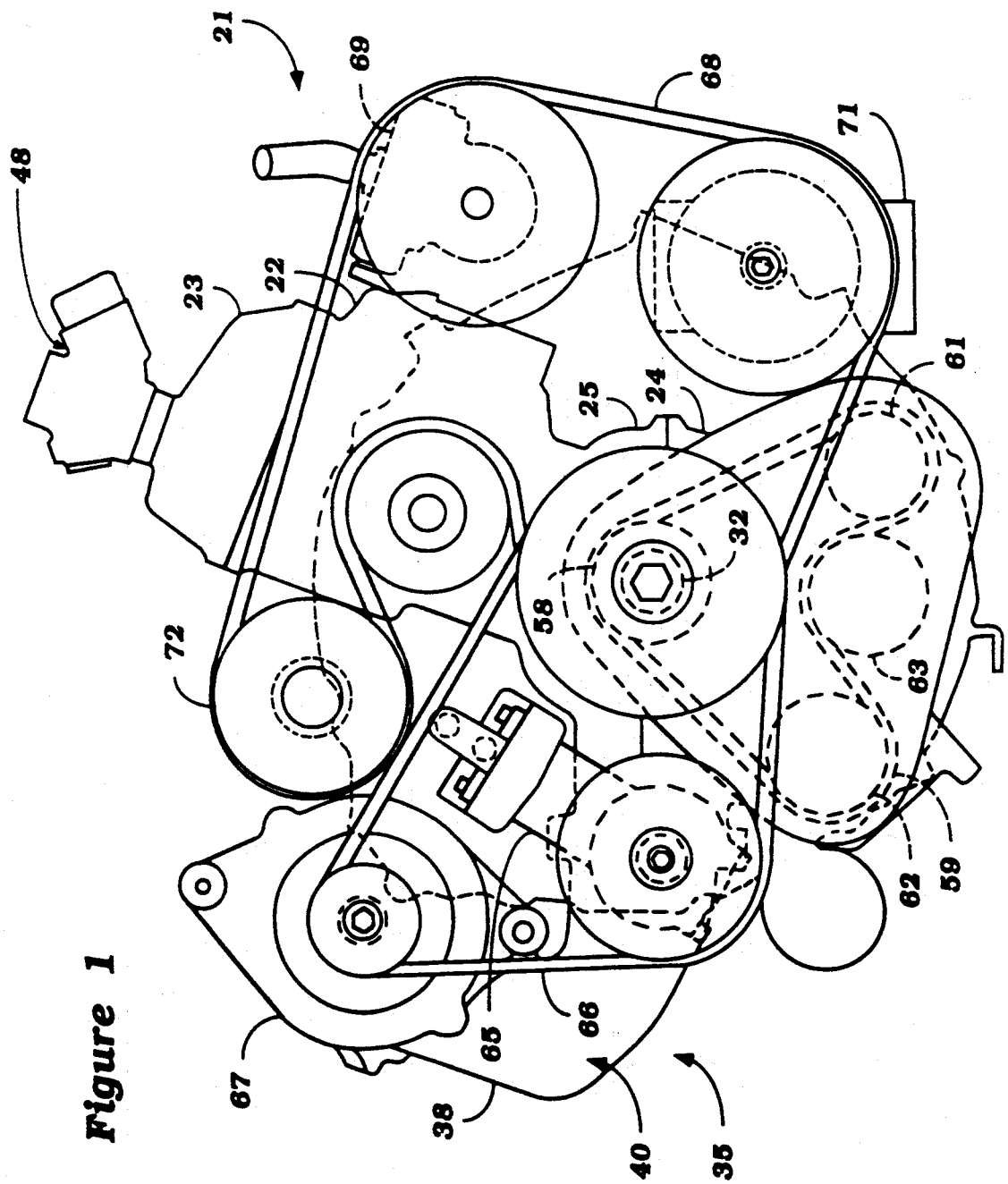
FIG. 1 is a front elevational view of a two cycle, crankcase compression, internal combustion engine constructed in accordance with an embodiment of the invention depicting how the engine would be positioned in the engine compartment of a motor vehicle for a transverse engine front wheel drive arrangement.

A three cylinder, inline, crankcase compression, internal combustion engine constructed in accordance with this embodiment of the invention is identified generally by the reference numeral 21. Although the invention is described in conjunction with a three cylinder inline engine, it should be readily apparent to those skilled in the art that certain facets of the invention can be employed in conjunction with engines having other numbers of cylinders and other cylinder configuration. Also, although the invention is described in conjunction with a two cycle, crankcase compression engine, some features of the invention may find utility in engines operating on other cycles. However, the invention has particular utility in two cycle, crankcase compression engines and particularly those intended for use in automotive applications.

Figure 2:
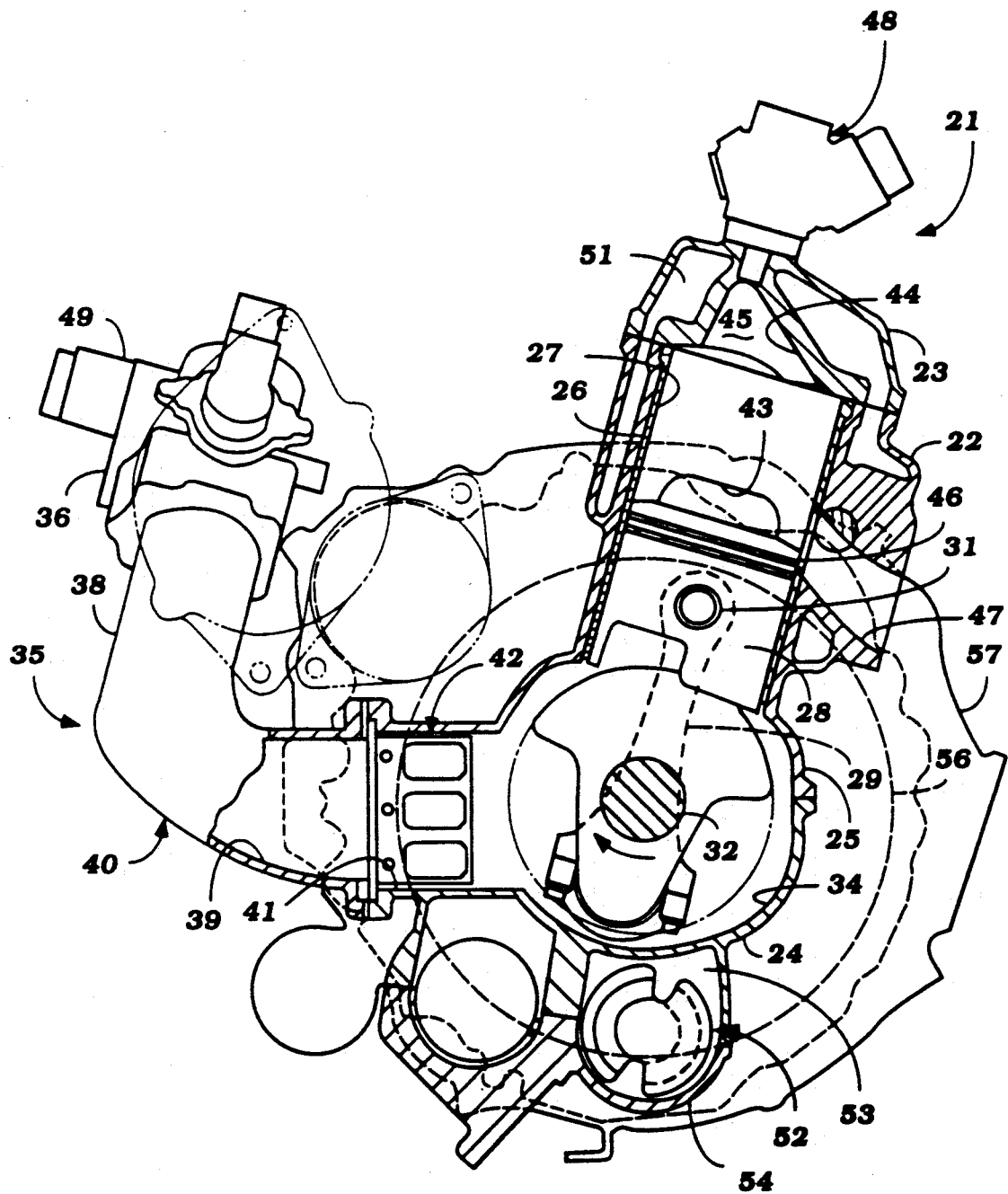
FIG. 2 is a front elevational view, with portions broken away, to show in detail the internal construction of the engine.

The engine 21 includes a cylinder block assembly 22 which, as has been noted, has an inline configuration in the illustrated embodiment. In the illustrated embodiment, the cylinder block 22 is disposed so that it is inclined from the vertical in a rearward direction as shown in FIGS. 1 and 2. This orientation is particularly advantageous when employed in conjunction with a front engine motor vehicle wherein the cylinder block 22 will be inclined slightly rearwardly toward the passenger compartment.

A cylinder head assembly 23 is affixed in a suitable manner to the cylinder block 22 at its upper end and a crankcase member, indicated generally by the reference numeral 24 is affixed to a skirt portion 25 at the lower end of the cylinder block 22.

Referring now in detail primarily to FIG. 2, the cylinder block 23 is formed from a light alloy material such as aluminum and is provided with pressed or cast-in cylinder liners 26 which define cylinder bores 27. The cylinder bores 27 all have their axes lying in a common plane which is, as has been noted, inclined to the vertical in a rearward direction when viewing the engine compartment transversely.

Pistons 28 reciprocate in each of the cylinder bores 27 and are connected to the upper ends of connecting rods 29 by piston pins 31. The lower ends of the connecting rods 29 are journalled on respective throws of a crankshaft 32 which is journalled for rotation in the crankcase formed by the cylinder block skirt portion 25 and the crankcase chamber 24 for rotation about an axis that lies in the aforenoted plane and which extends transversely across the engine compartment. The crankshaft 32 has bearing portions that are journalled within webs 33 of the cylinder block 22 and crankcase member 24. In addition to the bearings, there are provided seals so that the crankcase chamber is divided into individual chambers 34 each of which is sealed from the others, as is well known in two cycle engine practice.

An intake charge is delivered to each of the crankcase chambers 34 from an induction system, indicated generally by the reference numeral 35. This induction system 35 includes a throttle body 36 in which a flow controlling throttle valve (not shown) is received. An air cleaner embodying a filter element is provided for filtering an atmospheric air charge before delivery to the throttle body 36. The downstream end of the throttle body 36 communicates with a common inlet portion 38 of a manifold, indicated generally by the reference numeral 40 and which has individual runners 39 which communicate with intake ports 41 formed in the side of the crankcase member 24 and in which reed type check valves 42 are positioned. The reed type check valves 42 permit the flow of an intake charge into the intake ports 41 during upward movement of the pistons 28 but preclude reverse flow when the pistons 28 are moving downwardly to compress the charge in the crankcase chambers 34.

The charge which has been compressed in the crankcase chambers 34 is then transferred to the area above the pistons 28 through a plurality of scavenge passages 43 that are formed in the cylinder block 22 and cylinder liners 26. The area above the head of the piston 28, cylinder bore 27 and a recess 44 of the cylinder head 23 forms an individual combustion chamber 45 for each cylinder bore 27. A spark plug, not shown, if the engine is a spark ignited engine, is provided in the cylinder head 25 for firing the charge in the combustion chamber 45. Of course, the invention can also be employed in conjunction with diesel engines and in such instances no spark plug will be provided but there may be provided a glow plug for assisting in cold starting and cold running.

The burnt charge then exists through an exhaust port 46 formed in the cylinder liner 26 and to an exhaust passage 47 formed in the side of the cylinder block 22 for discharge to the atmosphere through a suitable exhaust manifold and exhaust system (not shown).

The fuel is supplied to the combustion chamber 45 by an air/fuel injector 48 of any known type that is mounted within the cylinder head 45. Reference may be had to my co-pending application entitled "Component Layout For Two Cycle Engine", Ser. No. 07/805,315, filed Dec. 10, 1991 and assigned to the Assignee hereof for the details of the construction of the fuel/air injector 48 it is to be understood, however, that the invention can be employed with conjunction with any type of fuel/air injector or, for that matter any type of charge forming system including direct cylinder fuel injection.

A sub-fuel injector 49 may also be supplied for providing additional fuel to the engine, particularly under high speed, high load conditions. The sub-injector 49 is mounted in the throttle body 36. The sub-injector 49 may be a pure fuel injector or may, like the injector 48, be an air/fuel injector.

The engine 21 is liquid cooled and to this end there is provided a cooling jacket 51 formed in the cylinder block 22 and cylinder head 23. Liquid coolant is circulated through the cooling jacket 51 by a suitable coolant pump.

The engine 21 has thus far described may be considered to be conventional and, for that reason, components which are conventional will not be described any further inasmuch as their construction and operation will be well known to those skilled in the art.

A balancer shaft, indicated generally by the reference numeral 52, is rotatably journalled within a balancer shaft chamber 53 formed beneath the crankcase chambers 34 and within the crankcase member 24 and a cover member 54 which is affixed thereto. The balancer shaft 52 is rotatably journalled in a pair of spaced apart bearings 55 and rotates about an axis that is parallel to the axis of the crankshaft 32 and at the same speed. Because of the fact that the engine 21 is a two cycle, crankcase compression, it is possible to put the balancer shaft 52 substantially beneath the crankshaft 32 without adding significantly to the height of the engine. This is because the engine does not require a crankcase that holds a volume of lubricant for its lubrication, as is true with conventional automotive engines that operate on the four stroke cycle.

Figure 3:
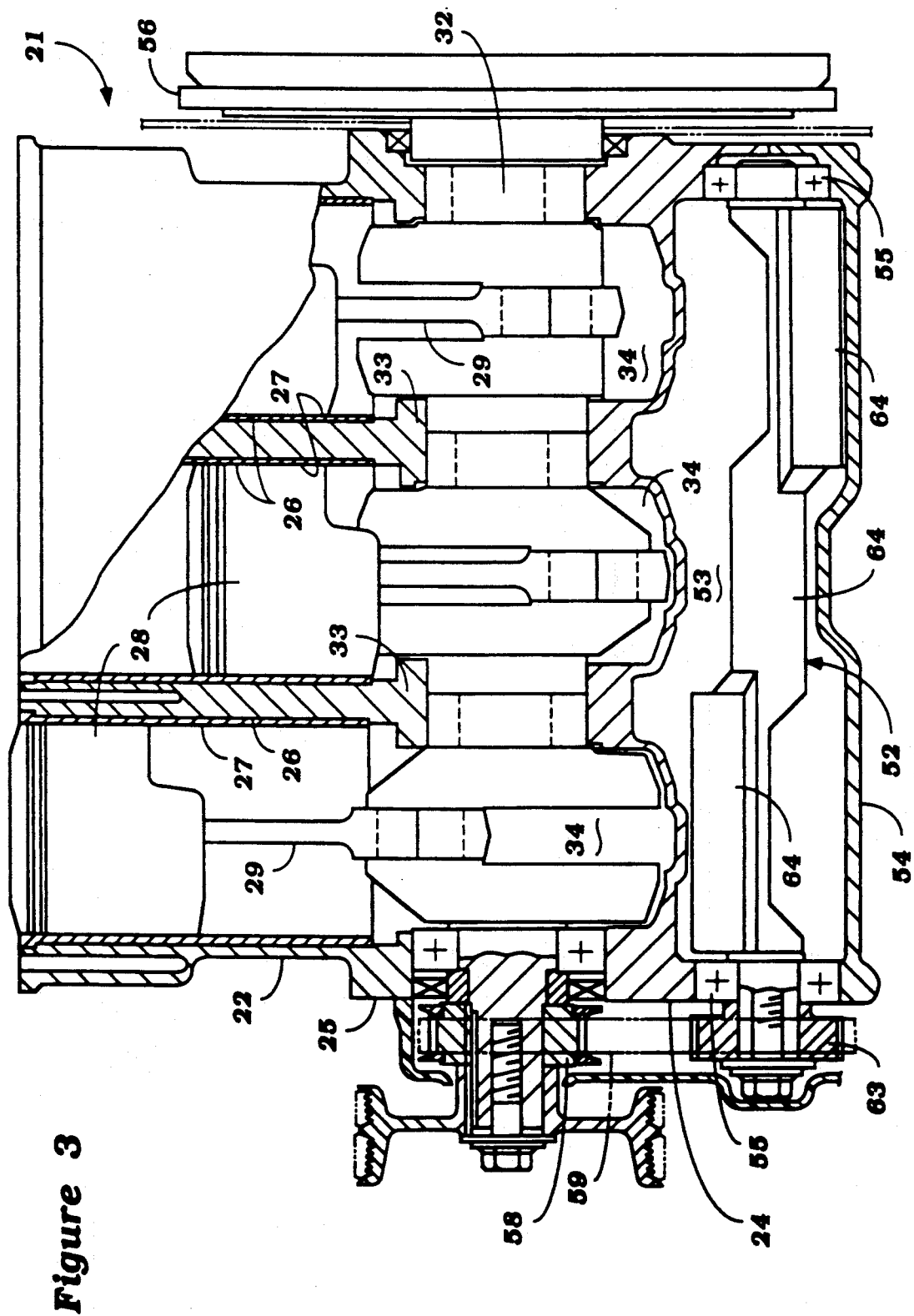
FIG. 3 is a side elevational view on an enlarged scale and with portions broken away.

As may be seen in FIGS. 2 and 3, a flywheel 56 is affixed for rotation with one end of the crankshaft 32 and has a relatively large outer diameter. The flywheel 56 is contained within a transmission casing 57 in which a change speed transmission is contained for driving the associated motor vehicle. The balancer shaft 52 is disposed radially inwardly from the periphery of the flywheel 56 and transmission casing 57, and, accordingly, the engine has no greater height than a conventional four stroke engine would without such a balancer shaft. This positioning of the balancer shaft 52 also permits better balancing of the engine.

The balancer shaft 52 is driven from the crankshaft 32 so as to rotate at crankshaft speed but in an opposite direction. This drive includes a driving sprocket 58 that is affixed to the end of the crankshaft 32 opposite to the flywheel 56 and which drives a drive belt 59. The drive belt 59 is entrained over an idler sprocket 61 and a tensioner sprocket 62 that are positioned on opposite sides of the balancer shaft 52 and also below the crankshaft 32. A driving sprocket 63 is affixed for rotation with the forward end of the balancer shaft 52 and is engaged by the belt 59 for its drive.

The balancer shaft 52 has formed integrally with it three eccentric masses 64, one for each cylinder 72 of the associated engine. As is well known, the rotation of the eccentric masses will cause the balancing of certain forces on the engine.

The engine is provided with a number of accessories which are also driven by the crankshaft 32. These accessories include an air compressor 65 which is driven by a first drive belt 66 and which supplies air under pressure to the fuel/air injector 48. In addition, an alternator 67 is driven by this same belt.

A further serpentine belt 68 may drive a number of other engine accessories such as a power steering pump 69, an air compressor 71 and a water pump assembly 72 for circulating coolant through the cooling jacket of the engine 21.

It should be readily apparent that the foregoing embodiment provides a low height, internal combustion engine and balancer shaft arrangement which is particularly adapted for use with two cycle engines. Of course, it is to be understood that the invention may be employed in conjunction with engines of other types and various other changes and modifications may be made without departing from the spirit and scope of the invention, as defined by the appended claims.

I claim:

1. A balancer shaft arrangement for an internal combustion engine comprising a crankcase defining at least one crankcase chamber in which a crankshaft rotates, a cylinder block extending from one side of said crankcase and defining at least one cylinder bore receiving a piston driving said crankshaft, a balancer shaft chamber contiguous to but sealed from said crankcase chamber, and a balancer shaft driven by said crankshaft and contained within said balancer shaft chamber.

2. A balancer shaft arrangement as set forth in claim 1 wherein the cylinder block extends substantially vertically and the balancer shaft axis is disposed below the crankshaft axis.

3. A balancer shaft arrangement as set forth in claim 1 wherein the engine operates on a two cycle, crankcase compression principal and further includes an induction system for delivering an air charge to the crankcase chamber.

4. A balancer shaft arrangement as set forth in claim 3 wherein the cylinder block extends substantially vertically and the balancer shaft axis is disposed below the crankshaft axis.

5. A balancer shaft arrangement as set forth in claim 4 wherein the balancer shaft is driven from the crankshaft by a belt drive embodying tension and idler pulleys disposed on opposite sides of the balancer shaft axis for rotating the balancer shaft in a direction opposite to the direction of rotation of the crankshaft.

6. A balancer shaft arrangement as set forth in claim 1 wherein the balancer shaft is driven at one end of the crankshaft and wherein a flywheel is affixed to the opposite end of the crankshaft for providing an output from the engine.

7. A balancer shaft arrangement as set forth in claim 6 wherein the balancer shaft axis is disposed at a lesser distance from the crankcase shaft axis then the radius of the flywheel.

8. A balancer shaft arrangement as set forth in claim 7 wherein the cylinder block extends substantially vertically and the balancer shaft axis is disposed below the crankshaft axis.

9. The balancer shaft arrangement as set forth in claim 6 wherein the engine operates on a two cycle, crankcase compression principal and further includes an induction system for delivering an air charge to the crankcase chamber.

10. A balancer shaft arrangement as set forth in claim 9 wherein the cylinder block extends substantially vertically and the balancer shaft axis is disposed below the crankshaft axis.

11. A balancer shaft arrangement as set forth in claim 10 wherein the balancer shaft is driven from the crankshaft by a belt drive embodying tension and idler pulleys disposed on opposite sides of the balancer shaft axis for rotating the balancer shaft in a direction opposite to the direction of rotation of the crankshaft.

12. A balancer shaft arrangement for an internal combustion engine comprising a crankcase defining at least one crankcase chamber in which a crankshaft rotates, a cylinder block extending from one side of said crankcase and defining at least one cylinder bore receiving a piston driving said crankshaft, a balancer shaft journalled on an axis parallel to the axis of rotation of said crankshaft, and means for driving said balancer shaft from said crankshaft comprising belt drive and tension and idler pulleys disposed on opposite sides of said balancer shaft axis for rotating said balancer shaft in a direction opposite to the direction of rotation of said crankshaft.

13. A balancer shaft arrangement as set forth in claim 12 wherein the engine operates on a two cycle, crankcase compression principal and further includes an induction system for delivering an air charge to the crankcase chamber.

14. A balancer shaft arrangement as set forth in claim 13 wherein the cylinder block extends substantially vertically and the balancer shaft axis is disposed below the crankshaft axis.

15. A balancer shaft arrangement as set forth in claim 12 wherein the balancer shaft is driven at one end of the crankshaft and wherein a flywheel is affixed to the opposite end of the crankshaft for providing an output from the engine.

16. A balancer shaft arrangement as set forth in claim 15 wherein the balancer shaft axis is disposed at a lesser distance from the crankcase shaft axis then the radius of the flywheel.

17. A balancer shaft arrangement as set forth in claim 16 wherein the engine operates on a two cycle, crankcase compression principal and further includes an induction system for delivering an air charge to the crankcase chamber.

18. A balancer shaft arrangement as set forth in claim 17 wherein the cylinder block extends substantially vertically and the balancer shaft axis is disposed below the crankshaft axis.

* * * * *